US006660244B2

(12) United States Patent
Negishi et al.

(10) Patent No.: US 6,660,244 B2
(45) Date of Patent: Dec. 9, 2003

(54) HYDROGEN GENERATING SYSTEM

(75) Inventors: Yoshimasa Negishi, Nishikamo-gun (JP); Masaaki Yamaoka, Toyota (JP); Kyo Hattori, Nisshin (JP); Kazumasa Takada, Kariya (JP); Hiromi Tanaka, Toyota (JP); Shigeto Kajiwara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 134 days.

(21) Appl. No.: 09/810,621

(22) Filed: Mar. 19, 2001

(65) Prior Publication Data

US 2001/0026777 A1 Oct. 4, 2001

(30) Foreign Application Priority Data

Mar. 22, 2000 (JP) ........................................ 2000-079388
Dec. 18, 2000 (JP) ........................................ 2000-383485

(51) Int. Cl.[7] ................................................ C01B 3/26
(52) U.S. Cl. ........................ 423/652; 252/373; 422/190; 422/211
(58) Field of Search .......................... 252/373; 422/190, 422/211; 423/648.1, 652

(56) References Cited

U.S. PATENT DOCUMENTS 3,745,047 A    7/1973   Fanciullo et al. ......... 136/86 B
6,048,473 A    4/2000   Denda et al. ............... 252/376
6,063,515 A  * 5/2000   Epp et al. ..................... 429/17

FOREIGN PATENT DOCUMENTS

| DE | 2157722 | 7/1972 |
| DE | 196 23 937 C 1 | 12/1997 |
| JP | A 08-121705 | 5/1996 |
| JP | A 2000-119001 | 4/2000 |

* cited by examiner

Primary Examiner—Stanley S. Silver
Assistant Examiner—Maribel Medina
(74) Attorney, Agent, or Firm—Oliff & Berridge, PLC

(57) ABSTRACT

The invention constructs a system which vaporizes a liquid raw material in a vaporizing section and steam-reforms the vaporized raw material in a reforming section to generate hydrogen. A pressure regulating valve for regulating the pressure in the vaporizing section is disposed at anywhere from the vaporizing section to downstream of the reforming section. When a hydrogen requirement is increased, the pressure regulating valve is controlled to decrease the pressure in the vaporizing section. The pressure reduction makes it possible to promote vaporization in the vaporizing section such that the rate of generation of steam can be improved. Moreover, during start-up of the system, the control mode is changed to open the pressure regulating valve, thereby limiting the rate of increase in pressure just after the generation of reformed gas has started.

31 Claims, 7 Drawing Sheets

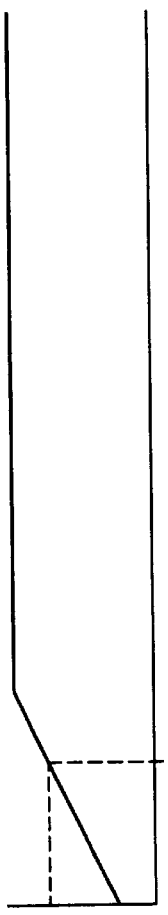
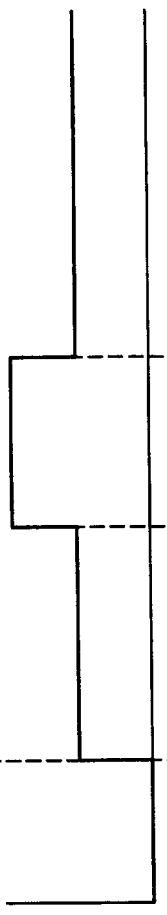
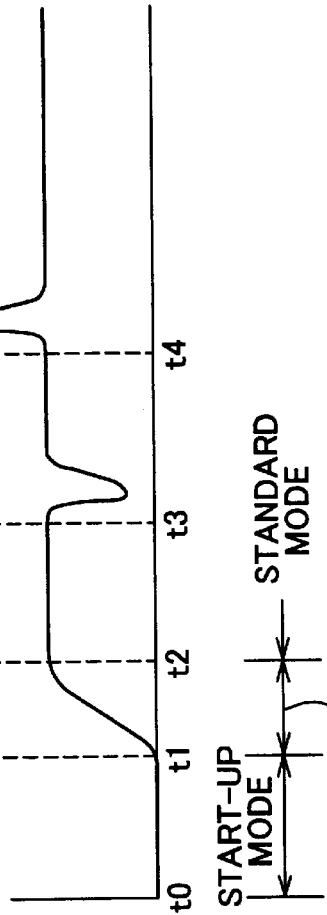
FIG. 6A TEMPERATURE T
FIG. 6B MOTIVE FORCE REQUIREMENT Pdrv
FIG. 6C TARGET PRESSURE P*
FIG. 6D SYSTEM PRESSURE P

HYDROGEN GENERATING SYSTEM

INCORPORATION BY REFERENCE

The disclosure of Japanese Patent Application Nos. 2000-79388 filed on Mar. 22, 2000 and 2000-383485 filed on Dec. 18, 2000 including the specification, drawings and abstract are incorporated herein by reference in their entirety.

BACKGROUND OF THE INVENTION

1. Field of the Invention

The invention relates to a hydrogen generating system and a method which reforms liquid raw materials to generate hydrogen rich gas, and to a vaporizer utilized in the system.

2. Description of the Related Art

Hydrogen to be supplied to systems, such as fuel cells, in which hydrogen is consumed is generated by reforming liquid raw materials, for example. As the liquid raw materials, liquefied natural gas, gasoline, other hydrocarbons, alcohols, ethers and aldehydes and the like are used in general. In a hydrogen generating system, these raw materials and water are vaporized by a vaporizer and made to undergo a reforming reaction in the presence of a catalyst such as platinum to thereby generate hydrogen rich reformed gas. In order to run the reaction stably, the reforming reaction is maintained in a predetermined temperature and pressure condition by feedback control or the like. This reformed gas is treated to decrease the concentration of components, such as carbon monoxide, and then supplied to a hydrogen consumption system, for example, a fuel cell.

In the hydrogen generating system, the quantity of hydrogen to be generated must follow the quantity of hydrogen to be consumed in a hydrogen consumption system. It is known that the rate-determining step as to the quantity of hydrogen to be generated is vaporization in a vaporizer. Therefore, an improvement in the speed of response of vaporization is required to improve the speed of response of the generation of hydrogen.

The following technologies are proposed with the intention of improving the speed of response of vaporization. For instance, a structure in which the vapor generated during a low load operation is accumulated in an accumulator and the quantity of vapor to be generated is compensated for by the accumulated vapor during a high load operation is disclosed in Japanese Patent Laid-Open Publication No. HEI 8-121705. Also, a structure in which vapor is always generated in a quantity much greater than the quantities required at each point in time is disclosed in Japanese Patent Laid-Open Publication No. HEI 2000-119001.

However, the above systems give rise to the following problems concerning an improvement in the speed of response of the quantity of hydrogen to be generated. In the structure described in Japanese Patent Laid-Open Publication No. HEI 8-121705, the accumulator constitutes an obstacle to the miniaturization of equipment. In recent years, a method in which a hydrogen generating system and a fuel cell are mounted on a mobile body such as a vehicle has been investigated. In such a case, because very severe restrictions are imposed on the mount space, there is a strong demand for miniaturization. Also, in the structure described in Japanese Patent Laid-Open Publication No. HEI 8-121705, a reduction in the temperature of the accumulated vapor must be suppressed to allow the reforming reaction to proceed efficiently, thus making the system more complex. Also, the structure described in Japanese Patent Laid-Open Publication No. HEI 2000-119001 has the problem of low energy efficiency because of the generation of excess vapor.

The systems disclosed in above publications also give rise to the following problems caused by pressure control in the reforming section, particularly at start-up. First, there a pressure control valve tends to be excessively restricted to maintain target pressure when there is an insufficient amount of reformed gas. Therefore, when generation of reformed gas is started, there is a possibility that delay of pressure control may cause the pressure in the reforming section to exceed the target value. Second, a rather high pressure is maintained at a relatively low temperature condition causing vaporized raw materials to be condensed and there is a possibility of the generated liquid adhering to the catalyst thereby decreasing the activity of the catalyst.

SUMMARY OF THE INVENTION

It is an object of the invention, first, to improve the speed of response of the quantity of hydrogen to be generated by improving the speed of response of the vaporization of raw materials and the like in a hydrogen generating system. Together with this improvement in response characteristics, the object of the invention is also to attain miniaturization of the equipment, to improve energy efficiency and to maintain the temperature of the vapor. It is an object of the invention, second, to provide a technology for avoiding the problems of vapor, which are caused by pressure control at start-up in the hydrogen generating system.

In the invention, at least part of the foregoing problems has been solved by the improvement in pressure control in a hydrogen generating system. In other words, conventionally, pressure in a hydrogen generating system is controlled such that it is kept in such a constant condition suitable for reformation and the like. The invention, however, adopts a structure in which pressure in the system is changed according to the operational conditions of the system at each point in time or the operational conditions required as shown below.

A hydrogen generating system which is a first embodiment of the invention comprises a vaporizing section, a reforming section and a pressure regulator, and further comprises a controller for controlling the pressure regulator on the basis of a quantitative requirement for hydrogen to be generated.

The vaporizing section is a unit for vaporizing liquid raw materials and is constructed of, for example, a vaporizer. The reforming section is a unit which reforms the vapor supplied from the vaporizing section. The reforming section includes a variety of units used to conduct a chemical reaction for generating hydrogen rich gas from raw materials. These units include a reforming unit which generates hydrogen and carbon monoxide (CO) by the vapor-reforming or partial oxidation of raw materials, a shift reaction unit which generates hydrogen and carbon dioxide by a shift reaction from carbon monoxide and water and a CO oxidation unit which selectively oxidizes carbon monoxide. The reforming section is provided with at least one of these units.

As described above, the speed of response of the generation of hydrogen in the hydrogen generating system is determined by the rate of vaporization. As commonly known, the rate of vaporization is affected by the pressure in the vaporizing section. According to the invention, not only the rate of vaporization but also the speed of response of the generation of hydrogen can be improved by controlling the pressure in the vaporizing section according to the quantitative requirement for hydrogen to be generated. Also, no large-scale equipment such as an accumulator is required and an improvement in the speed of a response can be achieved. It is also unnecessary to accumulate vaporized gas and therefore there is no problem due to the lowered vapor temperature. Moreover, because it is also unnecessary to generate excess vapor, energy efficiency can also be improved.

In the first embodiment, a pressure regulator may be provided in the vaporizing section. It is preferable to adopt a structure in which the vaporizing section is provided with a vapor generating section and a vapor heating section where the pressure in the vapor generating section is regulated by the pressure regulator. The vapor generating section is supplied with liquid raw materials while the pressure therein is regulated with a pressure regulator, forming a vapor-liquid mixed section of the raw materials. The vapor heating section is connected to a vapor phase portion of the vapor generating section and heats the raw materials of the vapor phase portion. This structure makes it possible to obtain a vapor having a desired temperature relatively easily.

Regulation of the pressure in the vapor generating section can be achieved, for instance, by disposing the pressure regulator in the connecting portion between the vapor generating section and the vapor heating section.

Also, the pressure regulator may be disposed downstream of the aforementioned vaporizing section. The pressure regulator maybe disposed, for instance, between the vaporizing section and the reforming section, inside of the reforming portion, and downstream of the reforming section, namely anywhere between the reforming section and a hydrogen consumption system. Since the vaporizing section is communicated with the reforming section, the pressure in the vaporizing section can be controlled even in these positions. These positions are also advantageous in that the pressure in the reforming section can be regulated together with regulation of the pressure in the vaporizing section.

In the case of disposing the pressure regulator inside of the reforming section, when the reforming section is provided with a first unit and a second unit disposed downstream of the first unit, the pressure regulator may be disposed between these units. Here, the first unit is a unit which generates a reformed gas containing hydrogen and carbon monoxide by a reforming reaction of the raw materials. The reforming unit described above, for example, corresponds to this unit. The second unit is a unit which decreases the quantity of carbon monoxide to be produced. The shift reaction unit or CO oxidation unit described above, for example, corresponds to this unit. In this structure, the pressure in the first unit can be controlled to a pressure higher than that of the second unit. This structure also is also advantageous in that the temperature of gas can be reduced by making use of adiabatic expansion when the reformed gas generated in the first unit is transferred to the second unit.

Control in response to the quantitative requirement for hydrogen to be generated can be achieved with various embodiments. For instance, an embodiment in which the pressure in the vaporizing section is decreased according to an increase in the quantitative requirement or a variation in the quantitative requirement may be adopted. Generally, vaporization can be promoted by decreasing pressure. When the intent is to promote vaporization constantly, the pressure may be decreased according to the quantitative requirement. When improving a transient response after the quantitative requirement is increased, the pressure may be decreased according to the variation in the quantitative requirement. It is possible to control the pressure in consideration of both the quantitative requirement and the variation in the quantitative requirement.

Pressure may be controlled by increasing the pressure in the vaporizing section according to the reduction in the quantitative requirement or the rate variation in the quantitative requirement. The reduction in the rate of variation includes both the case where when the rate of variation is positive its absolute value is decreased and the case where when the rate of variation is negative its absolute value is increased. This ensures that the generation of excess vapor can be suppressed rapidly, and thereby improving energy efficiency.

When the pressure in the vaporizing section is raised, heat can be accumulated as internal energy of the container and liquid raw materials because the boiling point of the raw material is raised. Then, by decreasing the pressure in the vaporizing section, vapor of the liquid raw materials can be generated using this internal energy. Therefore, when an increase in the generation of vapor is required, the quantity of vapor can be increased instantly by decreasing the pressure in the vaporizing section, whereas when a decrease in the generation of vapor is required, the quantity of vapor can be decreased instantly by increasing the pressure in the vaporizing section. Specifically, a load change can be dealt with rapidly.

In the first embodiment, hydrogen rich gas is generated as fuel to be supplied to a driving source of a mobile body and the first embodiment is therefore highly useful for an onboard system mounted on the mobile body. This is because the mobile body is strictly limited in its mount space and varies in the quantitative requirement relatively greatly. When the first embodiment is structured as an onboard system, the quantitative requirement may be determined based on, for example, the driving force requirement of the mobile body. It is to be noted that the mobile body includes vehicles, marine vessels, airplanes and flying bodies.

A hydrogen generating system which is a second embodiment of the invention comprises, as a second structure, a reforming section and a pressure regulator which regulates the pressure in the reforming section and further comprises a controller which controls the pressure by properly using at least two different modes. The two modes include a first control mode in which the reforming section is made to have a predetermined target pressure and a second control mode which is executed at the start-up of the hydrogen generating system unlike the first control mode. It is to be noted that the second embodiment may be applied not only to systems using liquid raw materials but also to other systems.

It is preferable that the pressure in the reforming section be maintained in a predetermined condition suitable for the promotion of a reaction when the hydrogen generating system is operated. At the start-up of the system, however, reformed gas is insufficiently generated and the temperature of the reforming section is low. Therefore in this condition, the reaction proceeds with difficulty. Conventionally, pressure control at start-up was not focused on at all. However, in such a condition, it is not always preferable to maintain the same pressure condition as that during regular operation. In the second embodiment, the control mode is switched at start-up and at regular operation such that pressure control suitable respectively to both operations can be attained.

In the second embodiment, for instance, the first control mode is designed to be feedback control in consideration of the time integral of the deviation between the aforementioned target pressure and actual pressure. And as the second control mode, a mode in which the influence of the time integral on the controlled variable is suppressed may be used. For example, the restraint of the influence of the time integral can be attained by decreasing the control gain for the time integral more than in the first control mode. Feedback control excluding the time integral term may also be provided.

Generally, the time integral term produces the effect of maintaining the past condition and smoothing variations in the controlled variable in the feedback control. Because the quantity of reformed gas to be generated is small at start-up of the system, the pressure regulator is controlled in the direction in which the pressure in the reforming section rises. If this condition is sustained for a long period of time, the response of the pressure regulator is delayed, affording the possibility of a rapid increase in the pressure in the reforming section in the case where the influence of the time integral term is large when generation of reformed gas has started. This phenomenon can easily be avoided by suppressing the influence of the time integral term.

For instance, the first control mode may be closed-loop control and the second control mode may be open-loop control. This restrains the pressure regulator from being operated excessively in the direction in which the pressure in the reforming section rises, and therefore a rapid increase in pressure after generation of reformed gas has started can be avoided. As the simplest open-loop control, the pressure regulator is designed to be maintained in a constant condition, for example, an open condition irrespective of the pressure in the reforming section.

The second embodiment of the invention may be further provided with a transfer control mode which suppresses the variation of pressure in the reforming section within a predetermined range when the system is transferred from the second control mode to the first control mode. In the case where the pressure in the reforming section is relatively low when the system is transferred to the first control mode, there is a possibility that the manipulated variable of the pressure regulator will be overshot and cause a rapid rise in pressure transitionally. However, this can be avoided with the provision of the transfer control mode. For the transfer control mode, a method in which the target value of pressure is decreased more than it was originally, a method in which a so-called "smoothing treatment" is provided for the control variable obtained in the first control mode, and a method in which the control variable is set in an open-loop and the like may be applied.

In addition to the above control, feedback control is applied together with the first control mode and the second control mode where the target value of pressure in the second control mode may be lower than in the first control mode. In the second control mode, an upper limit may be given to the manipulated variable in the pressure regulator.

In the second structure of the invention, for example, switching from the first control mode to the second control mode and vice versa may be conducted based on the quantity of state of gas in the aforementioned reforming section. As the quantity of state, the temperature and pressure in the reforming section, the components of the gas and the flow rate of the gas flowing out from the reforming section may be used either singly or in combination. For instance, when the temperature, pressure and flow rate are below the predetermined values respectively, the operation condition is determined as the start-up condition and therefore the second mode is applied. When these parameters are above the predetermined values respectively, the system can be switched to the first control mode. As the components of the gas, components such as hydrogen or carbon monoxide which vary in quantity according to the progress of the reaction in the reforming section are used and the system mode may be switched based on whether the concentration of each of these components is more than the predetermined value or not. These predetermined values as the standard for judging whether the system mode is switched or not can be set based on experiments or the like in advance according to the system structure. These quantities of state may be detected directly in the reforming section or indirectly at a portion, for example, downstream of the reforming section.

In the invention, a pressure regulating valve, a flow metering valve or the like may be used as the pressure regulator. It is preferable to use an electromagnetically controllable valve.

In the hydrogen generating system of the invention, for example, hydrocarbon type compounds may be used as the raw materials. Such compounds include liquefied natural gas, gasoline, other hydrocarbons, alcohols, ethers and aldehydes.

In the invention, the aforementioned various additional elements can be applied by appropriately combining them. Also, structural elements given in the first and second structures may be combined to constitute a single hydrogen generating system.

The invention can be structured with various embodiments in addition to the structure as the aforementioned hydrogen generating system. For example, the first embodiment of the invention may be structured as a vapor generator applied to the hydrogen generating system. The invention may also be structured as a control method which attains the control exemplified in the first and second structures for the hydrogen generating system. Other than the above, the invention may be structured as a fuel cell system in which the hydrogen generating system of the invention is combined with a fuel cell that generates electricity using hydrogen generated in the hydrogen generating system. The invention may also be structured as a mobile body (e.g., a vehicle) mounted with such a fuel cell system.

BRIEF DESCRIPTION OF THE DRAWINGS

The foregoing and other objects, features and advantages of the invention will become apparent from the following description with reference to the accompanying drawings in which like reference numerals refer to like elements and wherein:

FIG. 6A, FIG. 6B, FIG. 6C and FIG. 6D are time charts showing a variation in pressure and the like on the basis of a hydrogen generation control process in the second embodiment.

DETAILED DESCRIPTION OF THE PREFERRED EMBODIMENTS

A first embodiment of the invention will be described.

Figure 1:
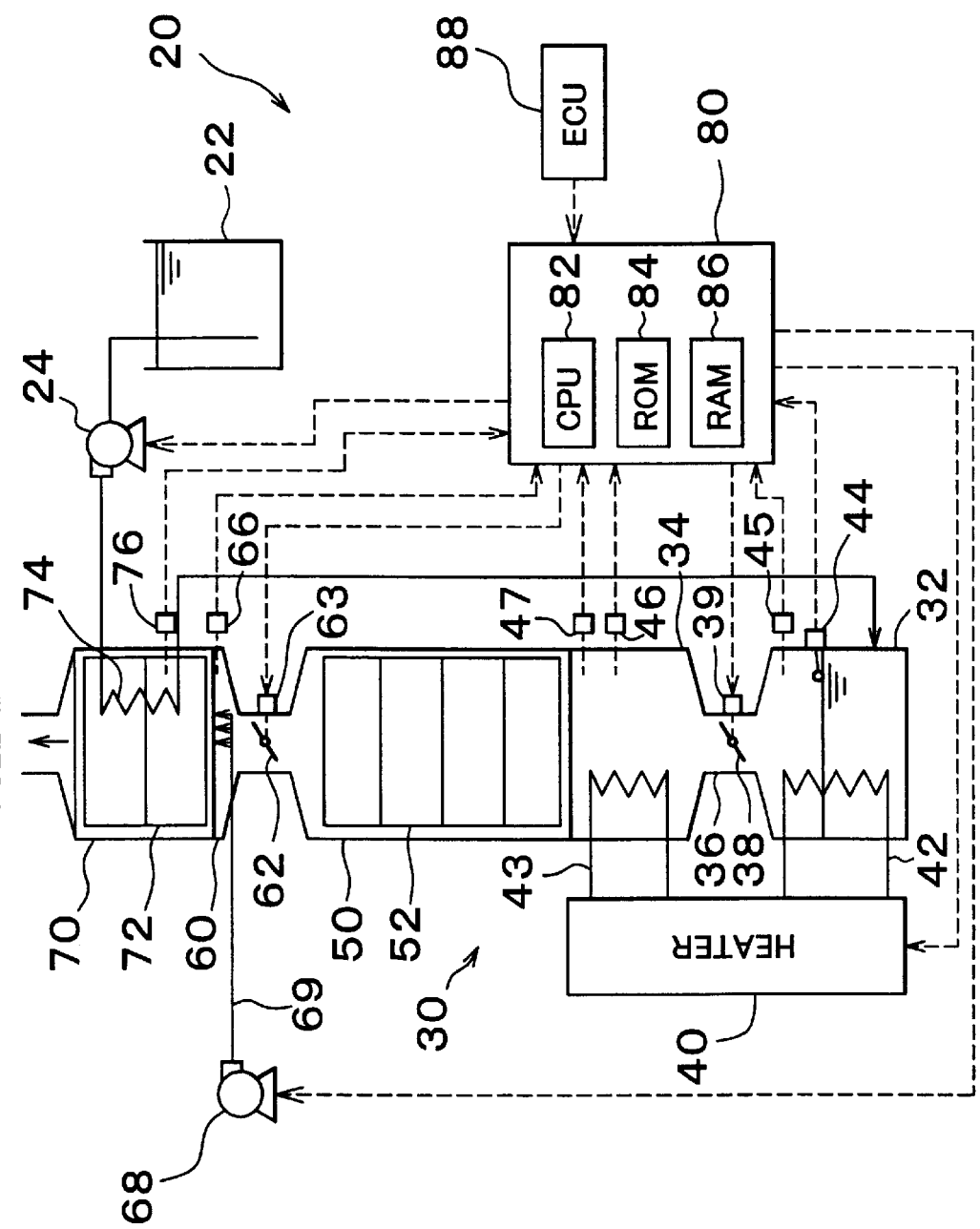
FIG. 1 is an explanatory view showing a schematic structure of a hydrogen generating system 20 in a first embodiment of the invention.

FIG. 1 is an explanatory view showing a schematic structure of a hydrogen generating system 20 in a first embodiment of the invention. The hydrogen generating system 20 is a system which generates hydrogen rich gas by reforming a raw material and comprises a vaporizing section 30, a reforming section 50, a pressure regulating section 60, a carbon monoxide reducing section 70 and an electronic control unit 80. As the raw material, for example, a hydrocarbon type raw material may be used. Methanol is used in this embodiment. The generated gas is supplied to equipment (e.g., a fuel cell or a hydrogen engine) which consumes fuel gas and utilized for the generation of electricity.

The vaporizing section 30 is a unit used to vaporize a reformed raw material which is a mixture of the raw material and water. The vaporizing section 30 is provided with a vapor-liquid mixed section 32 and a heating section 34. The vapor-liquid mixed section 32 is a portion where the liquid phase and vapor phase of the reformed raw material coexist and the reformed raw material is vaporized. The reformed liquid raw material is stored in a reformed raw material storage tank 22 and supplied to the vapor-liquid mixed section 32 by a pump 24. A supply pipe connected to the vapor-liquid mixed section 32 is structured such that the raw material is heated through a heat exchanger 74 of the carbon monoxide reducing section 70. The heating section 34 is a unit which heats the reformed raw material vaporized in the vapor-liquid mixed section 32 to a predetermined temperature.

The vapor-liquid mixed section 32 and the heating section 34 are respectively heated by a heater 40. The heater 40 is provided with a heat exchanger 42 for heating the vapor-liquid mixed section 32 and a heat exchanger 43 for heating the heating section 34 and the quantity of heat required for heating is controlled by an electronic control unit 80. In this embodiment, a heater using high temperature combustion gas obtained by burning fuel oil as a heat exchanging medium is used as the heater 40.

The vapor-liquid mixed section 32 is communicated with the heating section 34 through a connecting section 36. The connecting section 36 is formed as a throttle section having a smaller opening area than the vapor-liquid mixed section 32 and the heating section 34 and provided with a pressure regulating valve 38 which regulates the pressure in vapor-liquid mixed section 32. The pressure regulating valve 38 is provided such that it can deal with a fluctuation in the load applied to the hydrogen generating system 20 by regulating the opening thereof. The regulation of the pressure regulating valve 38 and its correspondence to the fluctuation in the load will be described later.

The reforming section 50 reforms the vaporized raw material to generate hydrogen rich reformed gas. The reforming section is filled with a monolith catalyst 52 obtained by coating the surface of a monolith carrier such as a honeycomb tube with a catalyst (e.g., a copper-zinc type catalyst) which steam-reforms methanol.

The carbon monoxide reducing section 70 decreases the quantity of carbon monoxide in the reformed gas. The carbon monoxide reducing section 70 is filled with a preferential oxidation catalyst 72 carrying a catalyst (e.g., a ruthenium type catalyst) which oxidizes carbon monoxide in preference to hydrogen in the presence of hydrogen and oxidizes carbon monoxide by oxygen containing gas (air in this embodiment) containing oxygen. The air is supplied from an air supply pipe 69 by a blower 68.

The reforming section 50 is communicated with the carbon monoxide reducing section 70 through the pressure regulating section 60. The pressure regulating section 60 responds to a fluctuation in load and lowers the temperature of the reformed gas. The pressure regulating section 60 is formed as a throttle section having a small opening area and provided with a pressure regulating valve 62 which regulates the difference in pressure between the reforming section 50 and the pressure regulating section 60. The pressure regulating valve 62 closes and opens according to the fluctuation in load.

In this embodiment, control is made such that the pressure in the reforming section 50 is higher than the pressure in the carbon monoxide reducing section 70. By this pressure difference, the reformed gas from the reforming section 50 is expanded adiabatically and the temperature is lowered when it is transferred to the carbon monoxide reducing section 70. Generally, the optimum temperature for the preferential oxidation of carbon monoxide in the carbon monoxide reducing section 70 is lower than the optimum temperature for the steam reforming reaction of methanol in the reforming section 50. Therefore, this can eliminate the need for a cooler in the carbon monoxide reducing section 70 or enable the cooler to be smaller by making use of the cooling effect of adiabatic expansion. A carbon monoxide oxidizing reaction in the carbon monoxide reducing section 70 is generally an exothermic reaction. In this embodiment, the reformed gas is heated and the carbon monoxide reducing section 70 is controlled at an optimum temperature by making use of the heat generated in the carbon monoxide reducing section 70 together with the adiabatic expansion of the reformed gas.

The electronic control unit 80 controls the entire system. The electronic control unit 80 is structured as a microprocessor including a CPU 82 as its major element and is provided with a ROM 84 storing a process program, RAM 86 storing data temporarily and an input/output port (not shown). Connected to the electronic control unit 80 are a level gage 44 disposed in the vapor-liquid mixed section 32, a pressure sensor 45 attached to the vapor-liquid mixed section 32, a temperature sensor 46 attached to the heating section 34, a pressure sensor 47 attached to the heating section 34, a pressure sensor 66 disposed in the pressure regulating section 60 on the side of the carbon monoxide reducing section 70, a temperature sensor 76 attached to the carbon monoxide reducing section and an electronic control unit (ECU) 88 which controls the operation of the equipment consuming fuel gas through an input port. Input to the electronic control unit 80 through an input port are the level of the reformed raw material from the level gage 44, a pressure P1 from the pressure sensor 45, a temperature T1 of the vaporized reformed raw material from the temperature sensor 46, a pressure P2 in the heating section 34 from the pressure sensor 47, a pressure P3 on the side of the carbon monoxide reducing section 70 from the pressure sensor 66, a temperature T3 in the carbon monoxide reducing section 70 from the temperature sensor 76, a load requirement Q* from the electronic control unit 88 indicating the load of the generation of fuel gas and the like. Also, the electronic control unit 80 outputs a drive signal to the pump 24, a drive signal to an actuator 39 of the pressure regulating valve 38, a control signal to the heater 40, a drive signal to an actuator 63 of the pressure regulating valve 62, a drive signal to the blower 68 and the like through an output port. It is to be noted that the electronic control unit 88 controls the equipment consuming fuel gas and gives an indication of the load to the electronic control unit 80.

Figure 2:
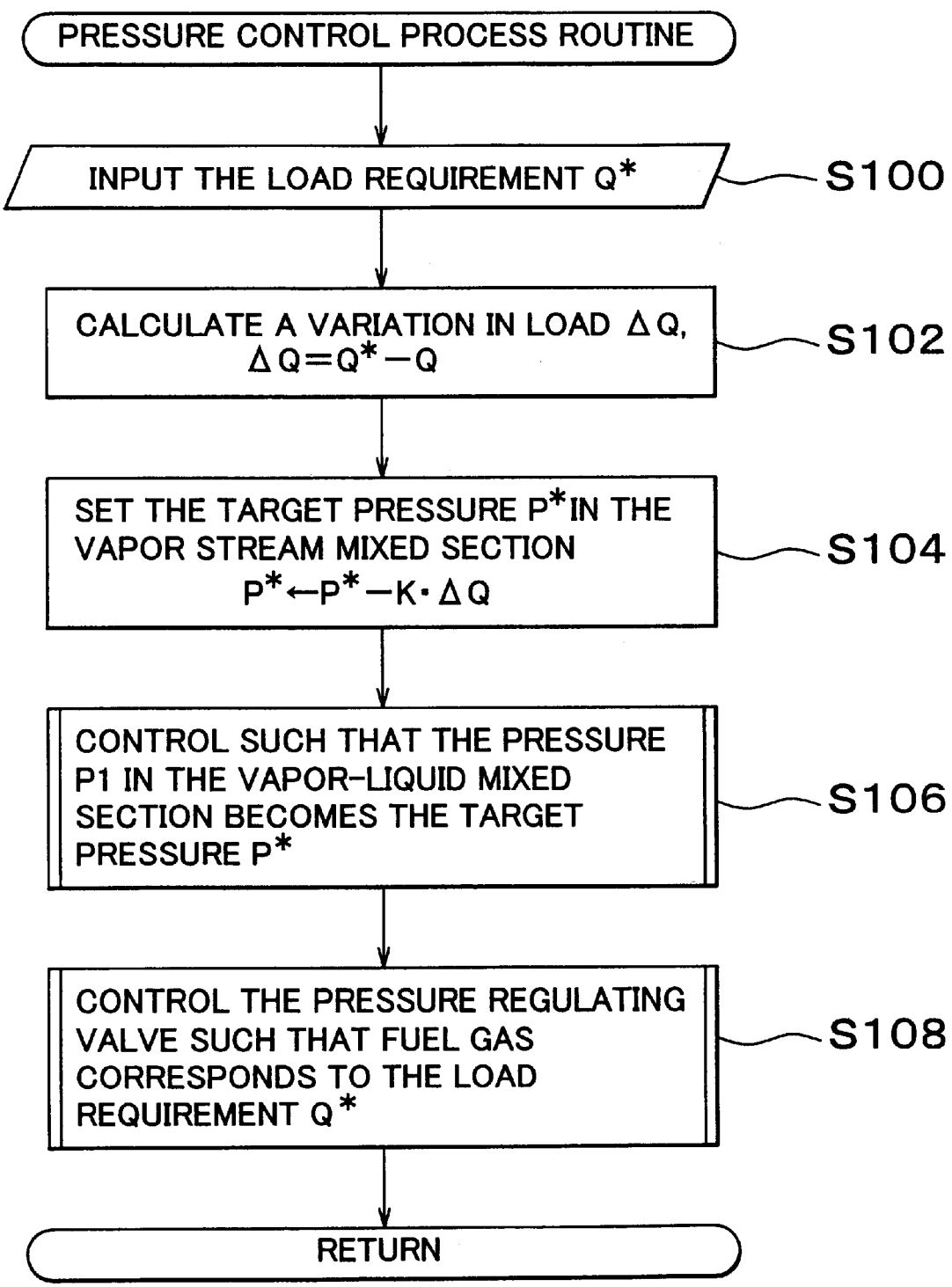
FIG. 2 is a flow chart of a pressure control process routine in the first embodiment.

Next, the action of the hydrogen generating section 20, particularly, the action of the vaporizing section 30 as a response to a variation in the load applied to the system will be described. FIG. 2 is a flowchart of a pressure control process routine in the first embodiment. This shows a process executed by the CPU 82 of the electronic control unit 80 to control the pressure in the vapor-liquid mixed section 32. In this embodiment, this routine is executed repeatedly at predetermined intervals of time (for example, every 100 msec) after the hydrogen generating system 20 is started up.

When the pressure control process routine is started, the CPU 82 reads the load requirement Q* from the electronic control unit 88 and subtracts the present load Q from the load requirement Q* to calculate a load variation ΔQ (Steps S100 and S102). In succession, the CPU 82 subtracts a value obtained by multiplying the load variation ΔQ by a positive gain K from a target pressure P* in the vapor-liquid section 32 to set a new target pressure P* (Step S104). Then, the opening of the pressure regulating valve 38 is controlled such that the pressure P1 in the vapor-liquid mixed section 32 becomes the target pressure P* (Step S106). Further, the opening of the pressure regulating valve 62 is controlled such that the quantity of fuel gas to be generated becomes the load requirement Q* (Step S108), and the present routine terminates.

Since the gain K used in Step S104 is a positive value, the target pressure P* is small when the load variation ΔQ is a positive value and the target pressure P* is large when the load variation ΔQ is a negative value. Control is made such that when the load is increased, the pressure P1 in the vapor-liquid mixed section 32 is decreased whereas when the load is decreased, the pressure P2 in the vapor-liquid mixed section 32 is increased. The rate of the vaporization of the reformed raw material increases with a reduction in the pressure in the vapor-liquid mixed section 32.

Such control ensures that when the load is increased, the pressure P1 in the vapor-liquid mixed section 32 is decreased to thereby lower the boiling point of the reformed raw material, whereby an increase in the quantity of vapor of the reformed raw material can be achieved using the internal energy (temperature) of the container and reformed raw material. Also, when the load is decreased, the pressure P1 in the vapor-liquid mixed section 32 is increased to thereby raise the boiling point of the reformed raw material, whereby the heat can be accumulated as the internal energy (temperature) of the container and reformed raw material. If the opening of the pressure regulating valve 38 is changed, the quantity of the vapor of the reformed raw material supplied to the heating section 34 is changed and the quantity of heat required for the heating in the heating section 34 is also changed. The change in the quantity of heat in the heating section 34 is relatively small, however, because the heat capacity of the vapor is small. For this, the change in the temperature of the vapor of the reformed raw material with a variation in load can be restricted to a small value.

The pressure in each of the vapor-liquid mixed section 32, the heating section 34, the reforming section 50 and the pressure regulating section 60 may be optionally set. When the generated fuel gas is supplied to a fuel cell, for example, the pressure in the vapor-liquid mixed section of the vaporizing section 30 is set to 4 to 7 atm, the pressure in each of the heating section 34 of the vaporizing section 30 and the reforming section 50 is set to 2 to 4 atm and the pressure in the pressure regulating section 60 is set to 1.5 to 2 atm.

In the hydrogen generating system 20 of the first embodiment as described above, the quantity of vapor generated in the vapor-liquid mixed section 32 can be increased or decreased rapidly, enabling a rapid response to a variation in load by controlling the pressure P1 in the vapor-liquid mixed section 32. Also, the size of the vaporizing section 30 can be reduced since pressure control is made such that the pressure in the vapor-liquid section 32 is higher than that of the heating section 34.

Also, in the hydrogen generating system 20 of this embodiment, a pressure difference is fixed between the reforming section 50 and the carbon monoxide reducing section 70, whereby the reformed gas is expanded adiabatically and the temperature of the reformed gas can be lowered. As a result, the size of the equipment for cooling the carbon monoxide reducing section 70 can be reduced. Also, energy loss resulting from the process in which heating and cooling are carried out in the same apparatus is able to be controlled.

In the hydrogen generating system 20 of this embodiment, a heater using high temperature combustion gas obtained by burning fuel as the heat exchange medium is used as the heater 40. Any heater may be used, however, as long as it can heat the vapor-liquid mixed section 32 and the heating section 34. For example, an electric heater may be used without any problem.

Although the vaporizing section 30 of this embodiment is described as an apparatus for generating vapor of a reformed raw material in the hydrogen generating system 20, the vapor to be generated is not limited to the vapor of the reformed raw material. The vaporizing section 30 may be applied to apparatuses generating vapor of any material.

Figure 3:
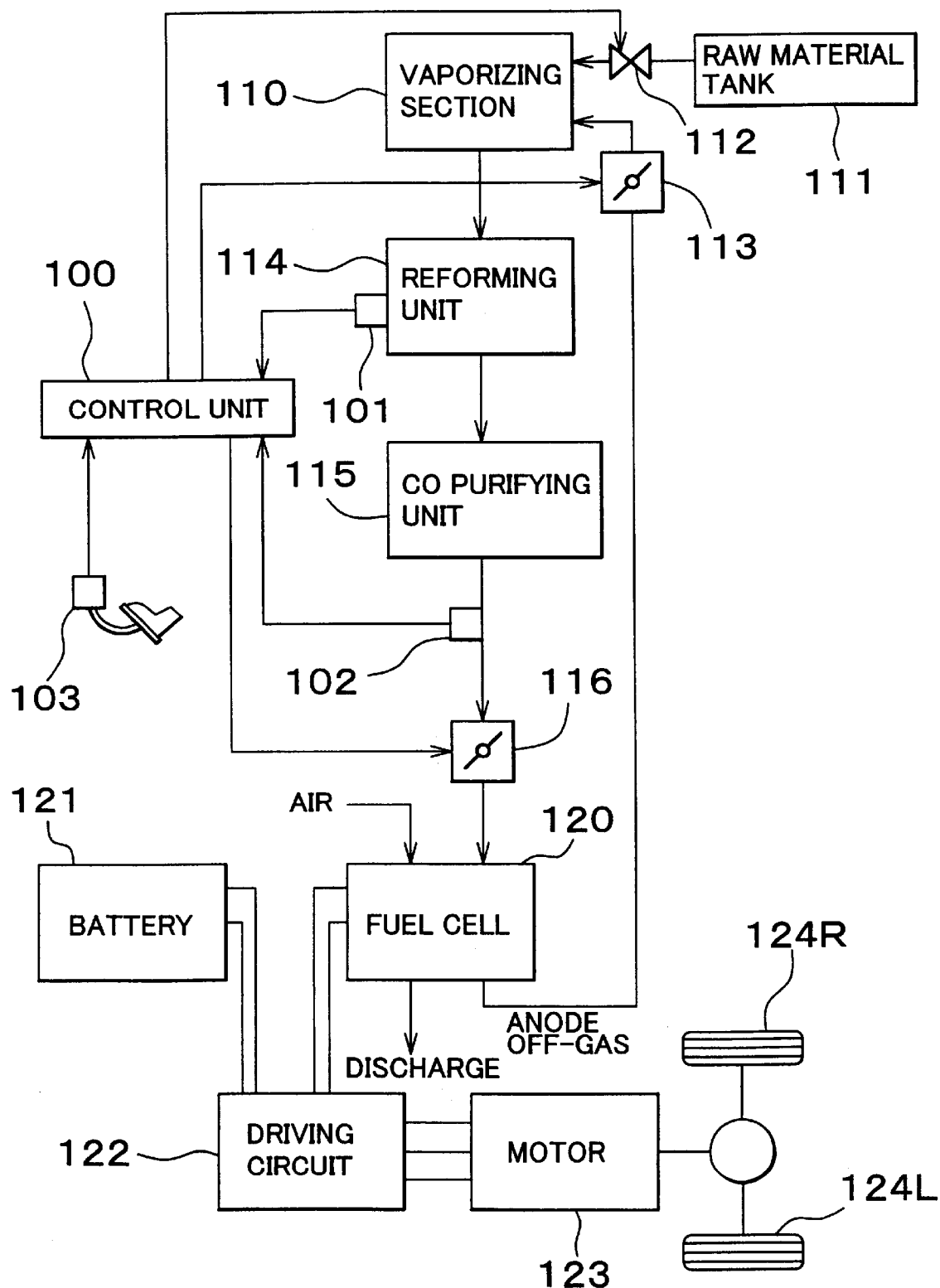
FIG. 3 is an explanatory view showing a schematic structure of a vehicle as a second embodiment.

A schematic structure of a vehicle as a second embodiment of the invention will be described with reference to an explanatory view of FIG. 3. The vehicle is run by rotating wheels 124R and 124L driven by the motive power of a motor 123 using a fuel cell 120 and a battery 121 as the power source. In this embodiment, a solid polymer type is used as the fuel cell 120 although various types may be applied.

In this embodiment, a synchronous motor is used as the motor 123. The motor 123 is driven by a three-phase alternating current converted from direct current obtained from the fuel cell 120 and the battery 121 by a driving circuit 122. As the driving circuit 122, for example, a transistor inverter may be applied. The major power source of the motor 123 is the fuel cell 120, with the battery 121 being utilized for to compensate for the delay of response of the power supplied from the fuel cell 120 and the like. The motor 123 can be regenerated using the kinetic energy of the vehicle as power during braking. The battery 121 is charged as appropriate with this regenerated power and by the fuel cell 120.

Hydrogen supplied to the fuel cell 120 is generated by an on-board hydrogen generating system mounted on the vehicle. The hydrogen generating system generates hydrogen by the reformation of a liquid raw material under the control of a control unit 100 in the same manner as in Example 1. In this embodiment, methanol is steam-reformed as the raw material. The system of the first embodiment can be mounted in place of the system exemplified in FIG. 3.

The liquid raw material, namely a mixed solution of methanol and water is stored in a raw material tank 111 and supplied to a vaporizing section 110 through a valve 112. The quantity to be supplied is regulated by the opening of the valve 112. In the vaporizing section 110, the liquid raw material is heated and gasified. The heating is carried out by burning flammable components in anode off-gas exhausted from the anode of the fuel cell 120. The operation of the vaporizer is controlled by regulating the supply quantity of the anode off-gas by a flow control valve 113 disposed in the middle of an exhaust gas line.

The raw material gasified in the vaporizing section 110 is supplied to a reforming unit 114. As in the first embodiment, the reforming unit 114 is a unit carrying a catalyst for steam-reforming the raw material. The raw material is steam-reformed here to generate reformed gas containing hydrogen and carbon monoxide.

The reformed gas is supplied to a CO purifying unit 115. The CO purifying unit 115 is a unit which decreases the concentration of carbon monoxide and carries a catalyst that selectively oxidizes carbon monoxide in the same manner as in the first embodiment. A heat exchanger used to cool the reformed gas to a temperature suitable for the oxidation reaction and a supplying machine used to supply air required for the oxidation reaction are omitted from the figure.

The gas processed by the selective oxidation reaction is supplied to the anode side of the fuel cell 120 as fuel gas. A flow control valve 116 is disposed between the CO purifying unit 115 and the fuel cell 120. The flow control valve 116 regulates the supply quantity of the fuel gas and functions as a pressure regulator which regulates the internal pressure in the vaporizing section 110 to the CO purifying unit 115.

In this embodiment, the control unit 100 controls the hydrogen generating system such that the hydrogen generating system generates hydrogen corresponding to the motive force requirement of the vehicle. This control includes the control of the quantity of the raw material to be supplied, the control of the quantity of heat in the vaporizing section 110, and the pressure control in the hydrogen generating system. In order to attain these controls, signals from various sensors are input to the control unit 100. In the figure, signals from an accelerator position sensor 103 used to detect the opening of the accelerator, a temperature sensor 101 used to detect the temperature of the reforming unit 114 and a pressure sensor 102 used to detect the pressure in the vaporizing section 110 to the CO purifying unit 115 are shown. Other signals are omitted from the figure to avoid complicating the figure.

Figure 4:
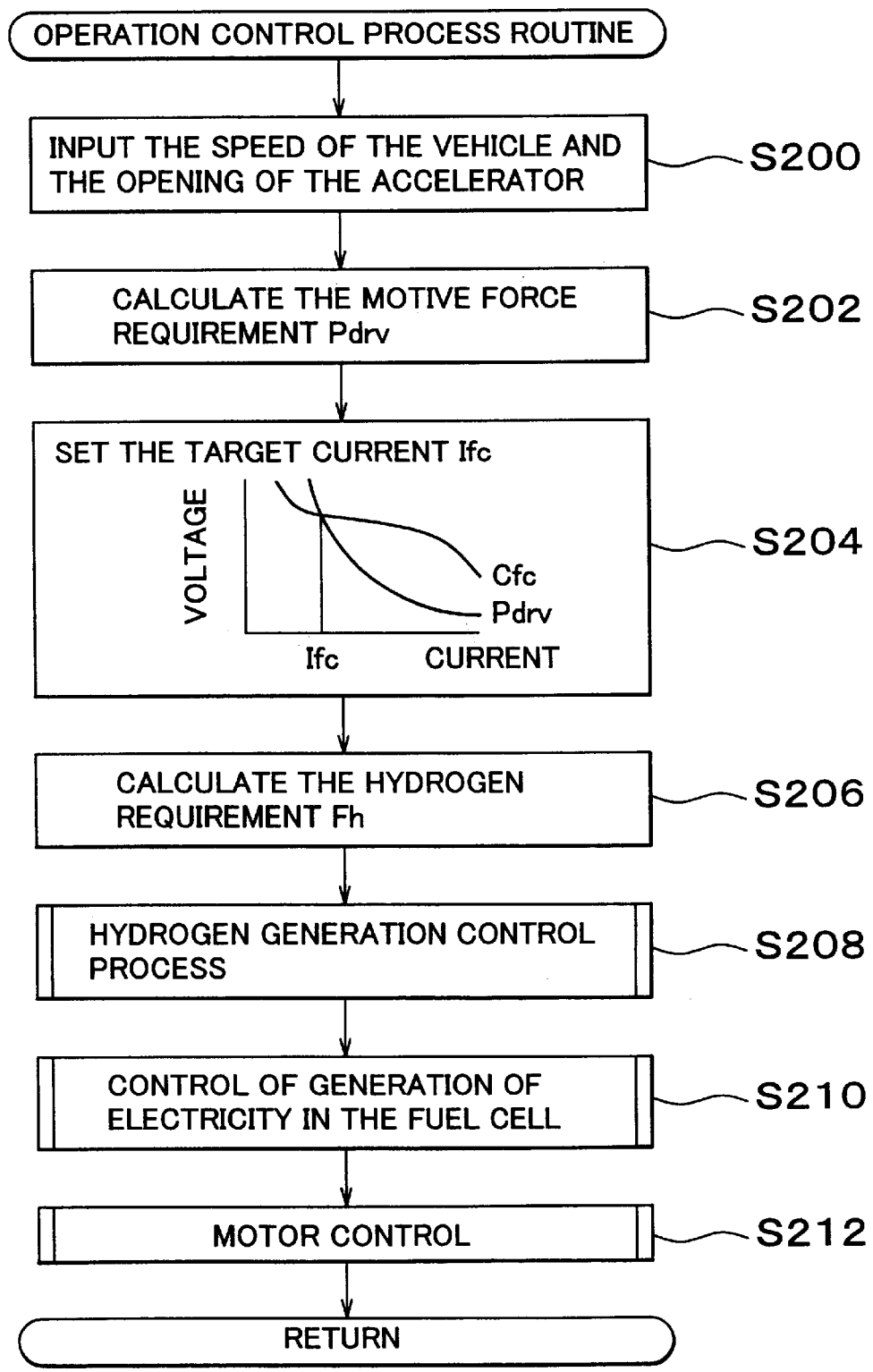
FIG. 4 is a flow chart of an operation control process.

FIG. 4 is a flowchart of an operation control process. The figure shows a process which is repeatedly executed at predetermined intervals by the control unit 100. When this process is started, the speed of the vehicle and the opening of the accelerator are input to the control unit 100 (Step S200). Because the opening of the accelerator corresponds to the torque required by a driver, the motive force (hereinafter referred to as running motive force) required for running can be specified based on these inputs. In this embodiment, the running motive force is obtained by a map showing the relation between the speed of the vehicle and the opening of the accelerator.

Next, the control unit 100 calculates a motive force requirement Pdrv for the fuel cell 120 (Step S102). In addition to the running motive force, motive force for charging and discharging the battery 121 and motive force for driving auxiliary machinery such as a hydraulic pump are required from the fuel cell 120. The motive force requirement is a positive value when the battery 121 is charged and a negative value when the battery 121 is discharged. The motive force requirement Pdrv is set in consideration of these motive forces and the transmission efficiency of energy.

When the motive force requirement Pdrv is set, a target current Ifc of the fuel cell 120 is set based on the set motive force requirement (Step S204). The target current Ifc is set in consideration of the motive force requirement Pdrv and the output characteristics of the fuel cell 120. In the figure, the output characteristic of the fuel cell 120, namely a voltage-current characteristic enabling the fuel cell to output is shown. The output of the fuel cell 120 is determined by the product of the voltage and the current. Therefore, the target current Ifc to attain the motive force requirement Pdrv is obtained from the intersecting point of the equi-power line and output characteristic curve of the motive force requirement Pdrv.

The power output from the fuel cell 120 correlates with the quantity of hydrogen to be supplied thereto. The control unit 100 sets a hydrogen requirement Fh to attain the target current Ifc based on this correlation (Step S206). This setting can also be made based on a map storing the relationship between the hydrogen requirement Fh and the target current Ifc. However, in this embodiment, the hydrogen requirement is determined based on the following formula.

$$Fh = Ifc \times N/(2 \times F)/\eta,$$

where;
N: Number of cells provided in the fuel cell 120,
F: Faraday constant,
$\eta$: Utilization factor of hydrogen (the proportion of hydrogen used for the generation of electricity in a unit amount of hydrogen).

The control unit 100 executes the control of the hydrogen generating system to attain the hydrogen requirement Fh set in the above manner (Step S208), the control of the generation of electricity in the fuel cell to generate electricity in accordance with the quantity requirement (Step S210) and the control of the operation of the motor 123 to output running motive force (Step S212).

Figure 5:
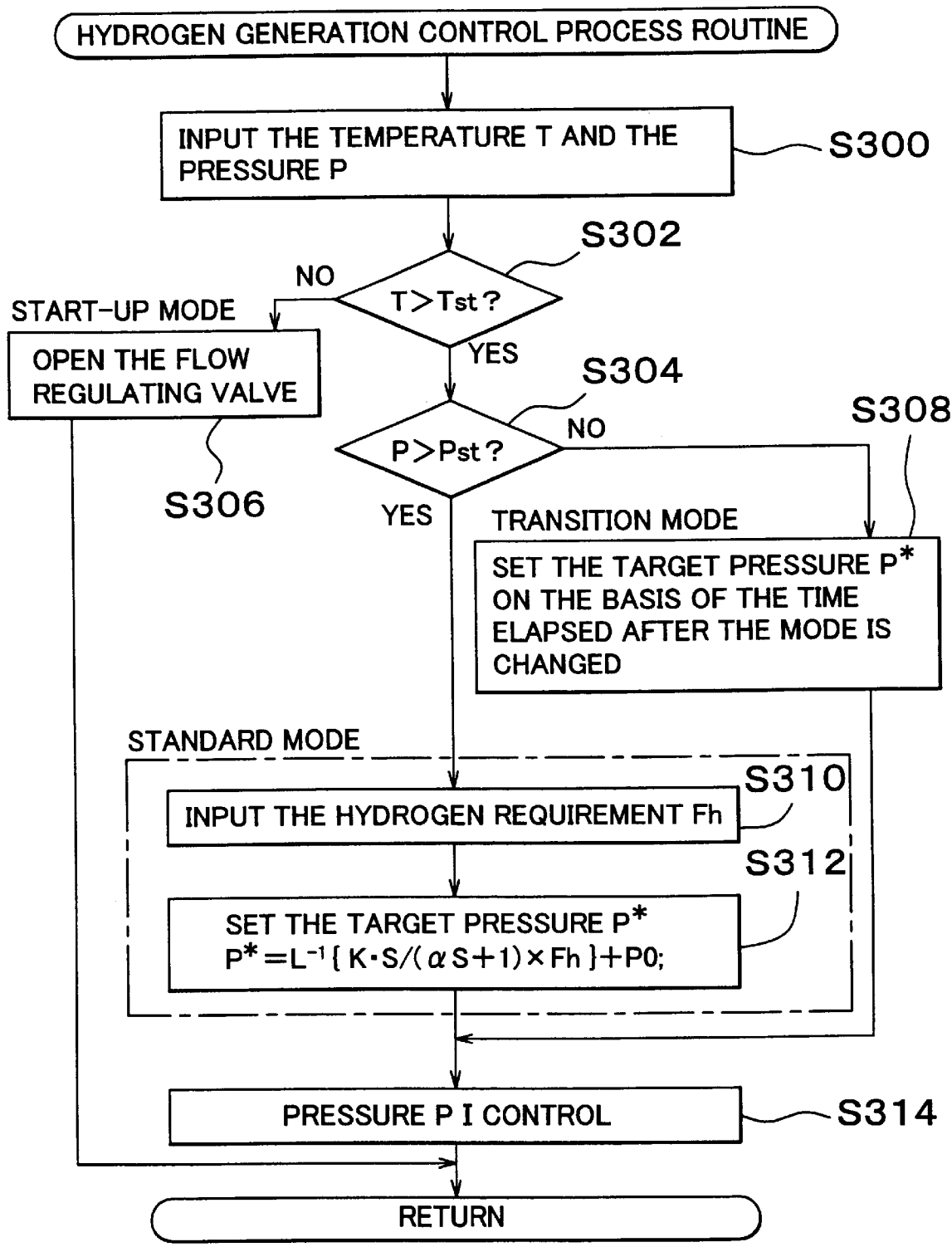
FIG. 5 is a flow chart of a hydrogen generation control process.

FIG. 5 is a flowchart of a hydrogen generation control process. This flowchart corresponds to details of Step S208 of FIG. 4. In this embodiment, the operation is controlled by properly using different modes, specifically a start-up mode, a transition mode and a standard mode corresponding to the operation conditions of the hydrogen generating system.

When the process is started, a temperature T of the reforming unit 114 and a pressure P in the hydrogen generating system are input to the control unit 100 as parameters for switching the control mode. Each value is detected by the sensors 101 and 102 shown in FIG. 3.

The proper use of these control modes on the basis of these parameters is as follows. When the temperature T of the reforming unit 100 is a predetermined temperature Tst or less (Step S302), the hydrogen generating system is judged to be non-warming, namely in the course of a start-up operation, and the system is controlled under the start-up mode (Step S306). In the case where the temperature T of the reforming unit 100 exceeds the predetermined temperature Tst and the pressure P in the hydrogen generating system exceeds a predetermined pressure Pst (Steps S302 and S304), the warming is judged to be finished and a sufficient amount of reformed gas is judged to be generated. Then, the standard mode is applied (Steps S310 and S312). In the case where the temperature T exceeds the predetermined temperature Tst but the pressure P is the pressure Pst or less (Steps S302 and S304), the system is judged to be in the condition just after the generation of reformed gas has started and the transition mode is applied. Since these predetermined values Tst and Pst are criteria for the switching of each control mode, these values may be respectively set to a proper value by experiments or the like in each system.

The process in each mode will be hereinafter described. It is to be noted that though not shown in the flowchart, the supply of the raw material and the heating control of the vaporizing section 110 are carried out together in each control mode.

In the start-up mode, the flow control valve 116 is put in an open condition (Step S306). At the start-up of the system, the reforming reaction proceeds insufficiently and therefore reformed gas is insufficiently generated. In this condition, if the intent is to maintain the pressure P in the system at the predetermined target pressure value by feedback control, the flow control valve 116 may be excessively restricted. In this embodiment, open-loop control is used in the start-up mode to avoid this problem and the flow control valve 116 is opened in one example.

In the start-up mode, not only the process exemplified in the embodiment but also various controls that enable the flow control valve 116 to avoid being in an excessively restricted condition are able to be applied. For example, as a first control means, the flow control valve 116 may be controlled to a state different from an open state. Also, as a second control means, feedback control that enables the restriction quantity of the flow control valve 116 to be suppressed may be applied. As the second control means, for instance, a method in which the target value of pressure is set to a relatively low value suitable for start-up or a method in which an upper limit may be given to the restriction quantity of the flow control valve 116 may be applied.

In the start-up mode, a mode allowing the valve to be restricted on the premise that the speed of the response of the flow control valve 116 is secured may be applied. For instance, a proportional-plus-integral (PI) control is applied and in the start-up mode, the gain of the integral term may be reduced more than in the other modes or neglected. As a result, the flow control valve can be opened promptly just after the reforming reaction has started.

In the standard mode, the pressure P in the system is feedback-controlled. In this embodiment, the target value of pressure is not set to a fixed value appropriate for the reforming reaction but is set according to the hydrogen requirement Fh.

Accordingly, in the standard mode the hydrogen requirement Fh is input to the control unit 100 (Step S310) and based on this input, the control unit 100 sets the target pressure P* according to the following formula (Step S312).

$$P^* = L^{-1}: \{K \cdot s/(\alpha s+1) \times Fh\} + P0;$$

where;
K, α: coefficient (K<0);
s: variable when a function of time t is processed by the Laplace transformation;
P0: standard pressure value (for example 1 atm)
$L^{-1}$: operator for Laplace inverse transformation.

This equation means that the target pressure P* is a function in which a correction term depending on the time differential of the hydrogen requirement Fh is added to the pressure value P0 as the base.

To state functions having the same physical significance, the target pressure P* may be set using the following function.

$$P^* = K1 \cdot \Delta Fh + P0;$$

where;
K1: control gain (<0);
ΔFh: time difference of Fh.

In the case where either one of the aforementioned equations is used to set the target pressure P*, if the hydrogen requirement is increased, the target pressure P* becomes lower than the standard pressure value P0 in accordance with the rate of variation in the hydrogen requirement. Conversely, if the hydrogen requirement is decreased, the target pressure P* becomes higher than the standard pressure value P0 in accordance with the rate of variation in the hydrogen requirement. Since the correction term depends on the rate of variation in the hydrogen requirement Fh, the target pressure P* becomes closer to the standard pressure with time after the hydrogen requirement Fh is increased or decreased.

In the correction term, other parameters correlative with the rate of variation in the hydrogen requirement Fh may be used in place of the rate of variation in the hydrogen requirement Fh. Given as examples of these parameters are the rate of change in the opening of an accelerator and the motive force requirement Pdrv.

The control unit 100 executes the proportional-plus-integral (PI) control of pressure to attain the target pressure P* set in this manner (Step S314). The proportional-plus-integral (PI) control is feedback control under which the opening of the flow control valve 116 is determined based on the sum of a proportional term obtained by multiplying a deviation between the target pressure and the present pressure by a control gain and an integral term obtained by multiplying the integral value of the deviation by the control gain. Although only the proportional term and the integral term are used in this embodiment, a differential term may be combined as appropriate.

The transition mode is a control mode which is applied during the transition from the start-up mode to the standard mode. The pressure P in the system is feedback-controlled in the same manner as in the standard mode. However, the target pressure P* is set based on a fixed function irrespective of the hydrogen requirement Fh in consideration of the point that the system is in the transition state where the pressure is not sufficiently increased. In this embodiment, the target pressure P* is designed to be increased at a constant rate of variation from 0 to Pst as time passes after transfer from the start-up mode. The target pressure P* may be increased step by step or may be set to a relatively low constant value. The control unit 100 controls the pressure by the PI control in the same manner as in the standard mode on the basis of the target pressure P* set in this manner (Step S314).

The transition mode is a mode which is applied to suppress problems caused by excessive operation of the flow control valve 116 during the transition to the standard mode. Therefore, various control modes which suppress not only the operational valuable but also the rate of variation in the pressure in the system during the transition may be applied to the transition mode. For example, the upper limit of the target pressure or the rate of variation in the target pressure may be restricted in the same mode (Step S312) as the standard mode. In order to avoid a sudden change in the target pressure, the so-called "smoothing treatment" may be applied in the calculation in Step S312. As the smoothing treatment, a method in which an average of the calculated target pressure and the target pressure in the last time step is set as the target pressure P* may be applied.

FIG. 6A, FIG. 6B, FIG. 6C and FIG. 6D are time charts showing a variation in pressure and the like on the basis of a hydrogen generation control process in a second embodiment. FIG. 6A to FIG. 6D respectively show a variation in each of the temperature of the reforming unit 114, the motive force requirement Pdrv, the target pressure P* and the pressure P in the system.

It is supposed that the operation of the hydrogen generating system is started at time t0. At this point in time, the system is non-warming and the temperature T is therefore low. During a time interval up to the time t1 at which the temperature T exceeds the predetermined Tst, the system is controlled in the start-up mode. In this interval, the vehicle is in a condition in which it cannot run and the motive force requirement Pdrv from the driver is 0. In addition, because open-loop control is applied (Step S306 in FIG. 5), the target pressure P* is also 0. The pressure P fluctuates independently of the control and is therefore omitted from the figure.

When the time reaches the time t1 and the temperature T exceeds the predetermined temperature Tst, the control is transferred to the transition mode. At this point in time, running is allowed and the motive force requirement Pdrv is input. The target pressure P* increases to the pressure Pst at a constant rate of variation in accordance with the process of Step S308 of FIG. 5. As already described, the target pressure P* in the transition mode is not limited to such an embodiment but various settings may be applied. The pressure P increases gradually with an increase in the target pressure P* by feedback control.

When the time reaches the time t2 and the pressure P exceeds the predetermined pressure Pst, control is transferred to the standard mode. In the standard mode, the target pressure P* as well as the pressure P become constant (standard pressure value) while the motive force requirement Pdrv is a constant value (for example, the time interval between the time t2 and the time t3 in the figure). In FIG. 6, the case where the standard pressure value is the same as the pressure Pst is exemplified. It does not matter if they are different values.

It is supposed that the motive force requirement Pdrv increases temporarily in the interval between the time t3 and the time t4. At the time t3, not only the motive force requirement Pdrv but also the hydrogen requirement Fh is changed and the target pressure P* fluctuates according to that change. The target pressure P* decreases in the vicinity of the time t3 at which the hydrogen requirement Fh increases and returns to the standard pressure value as time passes. The target pressure P* increases in the vicinity of the time t4 at which the hydrogen requirement Fh decreases and returns to the standard pressure value as time passes. Each pressure P fluctuates according to the target pressure P*.

The hydrogen generating system of the second embodiment described above has the following advantages. First, in the standard mode, the speed of response of the generation of hydrogen can be improved by controlling the pressure on the basis of the rate of variation in the hydrogen requirement Fh. This advantage is effective, especially when the hydrogen requirement Fh is increased.

Figure 7A:
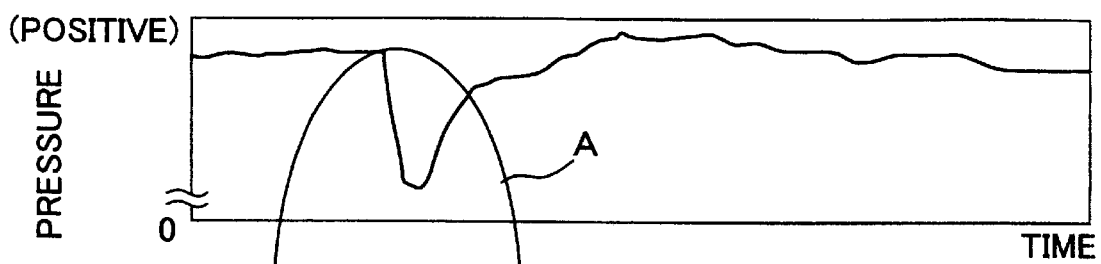
FIG. 7A and FIG. 7B are graphs showing the results of experiments concerning a change in the flow rate of reformed gas.
Figure 7B:
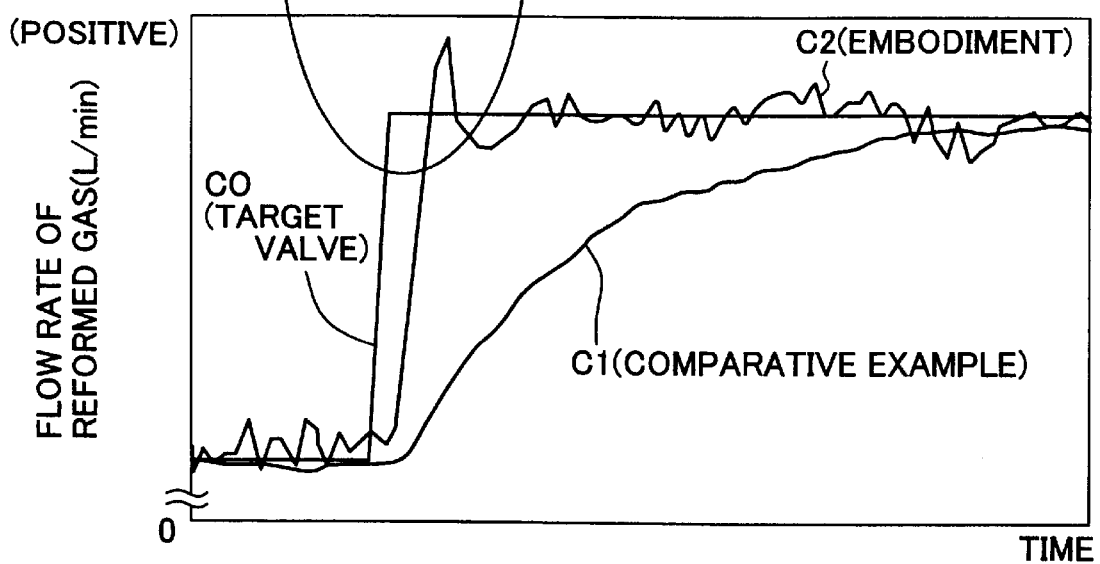

FIG. 7A and FIG. 7B are graphs showing the results of an experiment on variation in the flow rate of the reformed gas. A hydrogen requirement, namely the target value of the flow rate of the reformed gas, is shown by the curve C0. A change when applying the control used in the second embodiment, namely the control in which the pressure is decreased according to the rate of variation in the hydrogen requirement, is shown by the curve C2. A change when the target pressure is kept constant irrespective of the rate of variation in the hydrogen requirement is shown by the curve C1.

The same pressure fluctuation as that shown in the vicinity of the time t3 of FIG. 6D is observed in the vicinity of the time at which the hydrogen requirement acutely increases, namely in region A. When the pressure is decreased, the vaporization of the raw material in the vaporizing section 110 is promoted. The reforming rate can be improved by improving the speed of the vaporization corresponding to the rate-determining step of a reforming reaction. Such a principle, as is understood from FIG. 6A to FIG. 6D, ensures that the speed of response of the generation of hydrogen can be largely improved by applying the control in the embodiment. Although in FIG. 7A and FIG. 7B the experimental results of the case where the hydrogen requirement is increased are exemplified, the control of this embodiment makes it possible to suppress the generation of hydrogen promptly also in the case where the hydrogen requirement is decreased according to the same principle.

The control of this embodiment also offers the advantage that a sudden change in pressure can be suppressed by the proper use of different modes. Excess restriction of the flow control valve can be avoided by applying the start-up mode and the transition mode. Accordingly, a sudden increase in pressure caused by the delay of control of the flow control valve just after the generation of the reformed gas has started can be avoided. Also, condensation of the raw material can be suppressed and a reduction in the activity of the catalyst caused by condensation can be suppressed by applying the start-up mode to maintain a relatively low pressure in the reforming unit 114.

In the second embodiment, the case where the target pressure P* is set according to the rate of variation in the hydrogen requirement Fh is exemplified. Meanwhile, the target pressure P* may be set according to the hydrogen requirement Fh. For example, the following equation is used to set the target pressure P*.

$$P^* = K2 \cdot Fh + P0;$$

where; K2: control gain;

ΔFh: time difference of Fh.

If the target pressure P* is set in this manner, the target pressure P* fluctuates as shown by the dashed line in FIG. 6C. Even with this setting, not only vaporization but also a reforming reaction can be improved by decreasing the pressure P when the hydrogen requirement Fh is large. It is to be noted that parameters such as the opening of an accelerator and a motive force requirement which respectively have a correlation with the hydrogen requirement Fh are also possible in place of the hydrogen requirement Fh.

In this embodiment, a case is illustrated in which the pressure P is allowed to vary both when the hydrogen requirement Fh is increased and when the hydrogen requirement Fh is decreased. Conversely, the pressure P may be changed only when the hydrogen requirement Fh is increased. In such a case, a pressure fluctuation in the vicinity of the time t3 of FIG. 6D occurs while a pressure fluctuation in the vicinity of the time t4 does not occur.

In this embodiment, the pressure is controlled using the flow control valve 116 disposed downstream of the CO purifying unit 115. Conversely, the pressure may be controlled between the reforming unit 114 and the CO purifying unit 115, between the vaporizing section 110 and the reforming unit 114 or inside the vaporizing section 110.

In this embodiment, the control mode is switched using the temperature T and the pressure P. A determination may be made based on the flow rate of the gas exhausted from the CO purifying unit 115 or the amount of a specific component, such as the amount of hydrogen or carbon monoxide, in the gas instead of the aforementioned parameters.

In both the first embodiment and the second embodiment, the system used to reform methanol is exemplified. The invention may be structured as a system which reforms other hydrocarbon raw materials. For instance, the invention may be used for a system which reforms gasoline or other hydrocarbons. When gasoline or the like is reformed, it is desirable to dispose a unit used for a shift reaction between the reforming unit 114 and the CO purifying unit 115. Here, the shift reaction means a reaction for producing hydrogen and carbon dioxide from carbon monoxide and water.

In the illustrated embodiment, the control unit (the ECU 80, 100) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hard-wired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A hydrogen generating system for generating hydrogen rich gas by reforming a liquid raw material, said system comprising:
    a vaporizing section that vaporizes said liquid raw material;
    a reforming section that reforms the vapor supplied from said vaporizing section;
    a pressure regulator that regulates a pressure in said vaporizing section; and
    a controller that controls said pressure regulator based on a quantitative requirement of the generation of hydrogen for the hydrogen generating system.

2. A hydrogen generating system according to claim 1, wherein:
    said pressure regulator is provided in said vaporizing section.

3. A hydrogen generating system according to claim 2, wherein:
    said vaporizing section is provided with:
        a vapor generating section which is supplied with said liquid raw material and which forms a mixed section of said liquid raw material, said mixed section including a vapor phase portion and a liquid phase portion of the liquid raw material; and
        a vapor heating section which is connected to the vapor phase portion of said vapor generating section and which heats the liquid raw material in said vapor phase portion; and
    said pressure regulator regulates the pressure in said vapor generating section.

4. A hydrogen generating system according to claim 3, wherein:
    said pressure regulator is disposed at a connecting section of said vapor generating section and said vapor heating section.

5. A hydrogen generating system according to claim 1, wherein:
    said pressure regulator is disposed downstream of said vaporizing section.

6. A hydrogen generating system according to claim 5, wherein:
    said pressure regulator is disposed downstream of said reforming section.

7. A hydrogen generating system according to claim 5, wherein:
    said reforming section is provided with:
        a first unit that generates reformed gas containing hydrogen and carbon monoxide by a reforming reaction of said raw material; and
        a second unit downstream of the first unit, that decreases said generated carbon monoxide content; and
    said pressure regulator is disposed between said first unit and said second unit.

8. A hydrogen generating system according to claim 1, wherein:
    said controller controls said pressure regulator such that the pressure in said vaporizing section is decreased according to an increase in said quantitative requirement or in a rate of variation in said quantitative requirement.

9. A hydrogen generating system according to claim 1, wherein:
    said controller controls said pressure regulator such that the pressure in said vaporizing section is increased according to a decrease in said quantitative requirement or in a rate of variation in said quantitative requirement.

10. A hydrogen generating system according to claim 1, wherein:
    said hydrogen generating system is mounted on a mobile body to generate hydrogen rich gas as fuel to be supplied to a driving source of said mobile body.

11. A hydrogen generating system according to claim 10, wherein:
    said quantitative requirement is determined based on a driving force requirement of said mobile body.

12. A hydrogen generating system according to claim 1, wherein:
    said pressure regulator is a pressure regulating valve or a flow metering valve.

13. A hydrogen generating system according to claim 1, wherein:
    said raw material is a hydrocarbon compound.

14. A hydrogen generating system for generating hydrogen rich gas by reforming a raw material, said system comprising:
    a reforming section that reforms said raw material;
    a pressure regulator that regulates a pressure in said reforming section; and a controller that controls said pressure regulator with a first control mode in which the pressure in said reforming section becomes a predetermined target pressure, and controls said pressure regulator with a second control mode different from said first control mode at start-up of said hydrogen generating system.

15. A hydrogen generating system according to claim 14, wherein:
said first control mode is feedback control in consideration of a time integral of a deviation between said target pressure and actual pressure; and
said second control mode is a mode in which an influence on a controlled variable by said time integral is suppressed.

16. A hydrogen generating system according to claim 15, wherein:
said second control mode is a mode in which a control gain for said time integral is reduced more than in said first control mode.

17. A hydrogen generating system according to claim 14, wherein:
said first control mode is a closed-loop control and said second control mode is an open-loop control.

18. A hydrogen generating system according to claim 17, wherein:
said pressure regulator is maintained in a fixed condition in said second mode irrespective of the pressure in said reforming section.

19. A hydrogen generating system according to claim 14, wherein:
said controller is provided with a transition control mode in which the rate of variation in the pressure in said reforming section is suppressed within a predetermined range during a transition from said second control mode to said first control mode.

20. A hydrogen generating system according to claim 14, wherein:
switching of said first control mode and said second control mode is performed based on a quantity of state of vapor in said reforming section.

21. A hydrogen generating system according to claim 20, wherein:
said quantity of state of vapor includes at least one among a temperature and pressure in the reforming section, a component of a gas, and a flow rate of a gas flowing out from the reforming section.

22. A hydrogen generating system according to claim 14, wherein:
said pressure regulator is a pressure regulating valve or a flow metering valve.

23. A hydrogen generating system according to claim 14, wherein:
said raw material is a hydrocarbon compound.

24. A hydrogen generating system according to claim 14, wherein:
said target pressure is set according to a quantitative requirement of the generation of hydrogen for said hydrogen generating system or to a rate of variation in the quantitative requirement.

25. A vapor generating apparatus for producing a vapor of a liquid raw material, said apparatus comprising:
a vapor generating section which is supplied with said liquid raw material and which forms a vapor-liquid mixed section of said liquid raw material, said vapor-liquid mixed section including a vapor phase portion and a liquid phase portion;
a vapor heating section which is connected to the vapor phase portion of said vapor generating section and which heats the liquid raw material of said vapor phase portion; and
a pressure regulator that regulates a pressure in said vapor generating section based on a quantitative requirement of the production of the vapor.

26. A method of controlling a hydrogen generating system provided with a vaporizing section for vaporizing a liquid raw material, said system generating hydrogen rich gas by reforming said liquid raw material, said method comprising the step of:
controlling a pressure in said vaporizing section based on a quantitative requirement of the generation of hydrogen for said hydrogen generating system.

27. A control method according to claim 26, wherein:
said pressure control step decreases the pressure in said vaporizing section according to an increase in said quantitative requirement or in a rate of variation in said quantitative requirement.

28. A control method according to claim 26, wherein:
said pressure control steps increases the pressure in said vaporizing section according to a decrease in said quantitative requirement or in a rate of variation in said quantitative requirement.

29. A method of controlling a hydrogen generating system provided with a reforming section for reforming a raw material, said system generating hydrogen rich gas by reforming said raw material, said method comprising the steps of:
determining whether said hydrogen generating system is in the course of start-up based on predetermined parameters;
controlling a pressure in said reforming section with a first control mode in which said reforming section becomes a predetermined target pressure when said hydrogen generating system is not in the course of start-up; and
controlling the pressure in said reforming section with a second control mode different from said first control mode when said hydrogen generating system is in the course of start-up.

30. A control method according to claim 29, wherein:
the hydrogen generating system is determined to be in the course of start-up when a temperature of said reforming section is greater than a predetermined temperature.

31. A control method according to claim 29, further comprising the steps of:
determining whether there is a transition taking place from said second control mode to said first control mode when said hydrogen generating system is in the course of start-up and the pressure in said hydrogen generating system is lower than a predetermined pressure; and
controlling the pressure in said reforming section with a third mode in which a rate of variation in the pressure in said reforming section is suppressed within a predetermined range when there is determined to be a transition from said second control mode to said first control mode.

* * * * *